United States Patent [19]

Hiraiwa et al.

[11] Patent Number: 5,333,187
[45] Date of Patent: Jul. 26, 1994

[54] SWITCHING SYSTEM FOR ELECTRONIC SWITCHER

[75] Inventors: Masashi Hiraiwa; Yoshiaki Asambo, both of Yokohama, Japan

[73] Assignees: Hitachi, Ltd.; Hitachi Software Engineering Co., Ltd., Tokyo, Japan

[21] Appl. No.: 912,217

[22] Filed: Jul. 10, 1992

Related U.S. Application Data

[63] Continuation-in-part of Ser. No. 513,608, Apr. 24, 1990, abandoned.

[30] Foreign Application Priority Data

Apr. 28, 1989 [JP] Japan .................... 1-107666

[51] Int. Cl.$^5$ ............ H04M 7/00; H04M 9/06
[52] U.S. Cl. ................ 379/219; 379/230; 379/279
[58] Field of Search ......... 379/219, 268, 279, 229, 379/230, 235, 221, 10, 14; 370/58.1, 58.2

[56] References Cited

U.S. PATENT DOCUMENTS

| | | | |
|---|---|---|---|
| 4,455,645 | 6/1984 | Mijioka et al. | 379/279 X |
| 4,602,363 | 7/1986 | Das et al. | 379/225 |
| 4,625,082 | 11/1986 | Kelly | 379/279 X |

FOREIGN PATENT DOCUMENTS 62-48175 3/1987 Japan .

OTHER PUBLICATIONS

Telephony Magazine article entitled "Gazing into the SPC Network future reveals vista of new features" by Gordon et al. pp. 86, 88, 93, Feb. 21, 1983.
"II C.C.I.T.T. Signalling System No. 6" by Grandjean et al., Source publication: Het PTT-Bedrijf, vol. 19, No. 1-2, pp. 14-23 (Sep. 1974).
Institution of Electrical Engineering Report, 1979 "Signalling in Telecommunications Networks" by Welch pp. 260-321.
Telephony Magazine "Common channel Signalling based on CCITT system No. 7" pp. 85-98, Feb. 9, 1981.
Ericsson Review No. 2, 1982 "CCITT Signalling system No. 7 in AXE 10" by Rietz and Giertz pp. 101-105.

*Primary Examiner*—James L. Dwyer
*Assistant Examiner*—Ahmad F. Matar
*Attorney, Agent, or Firm*—Fay, Sharpe, Beall, Fagan, Minnich & McKee

[57] ABSTRACT

A switching control system is provided for an electronic switcher employing a common channel signalling. This system is designed to keep the common channel signalling for a speech path in parallel to the associated signalling system, invalidate the speech information in the associated signalling system for a speech path if the signal link is in a normal state and control the speech path in the common channel signalling system, and if failure takes place on the signal link, control the speech path in the associated signalling system.

11 Claims, 12 Drawing Sheets

BACKUP BY CHANGEOVER TO CHANNEL-ASSOCIATED SIGNALLING

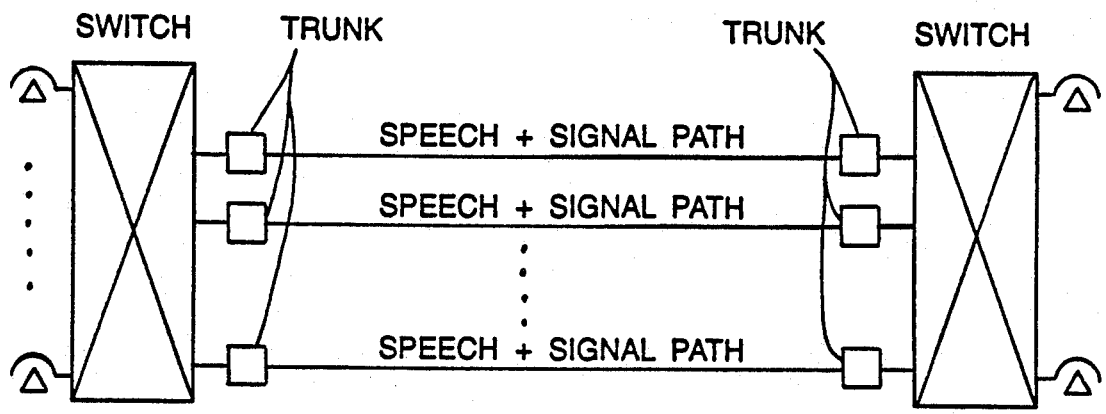
FIG. 10  CHANNEL-ASSOCIATED SIGNALLING ASPECTS
(PRIOR ART)
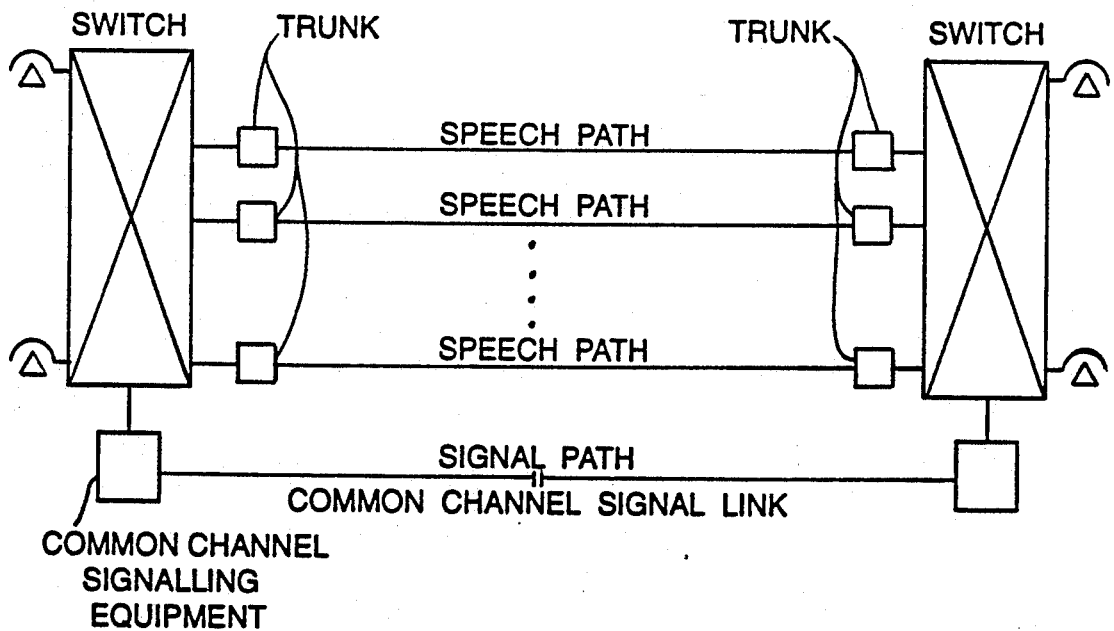
FIG. 11  COMMON CHANNEL SIGNALLING ASPECTS
(PRIOR ART)

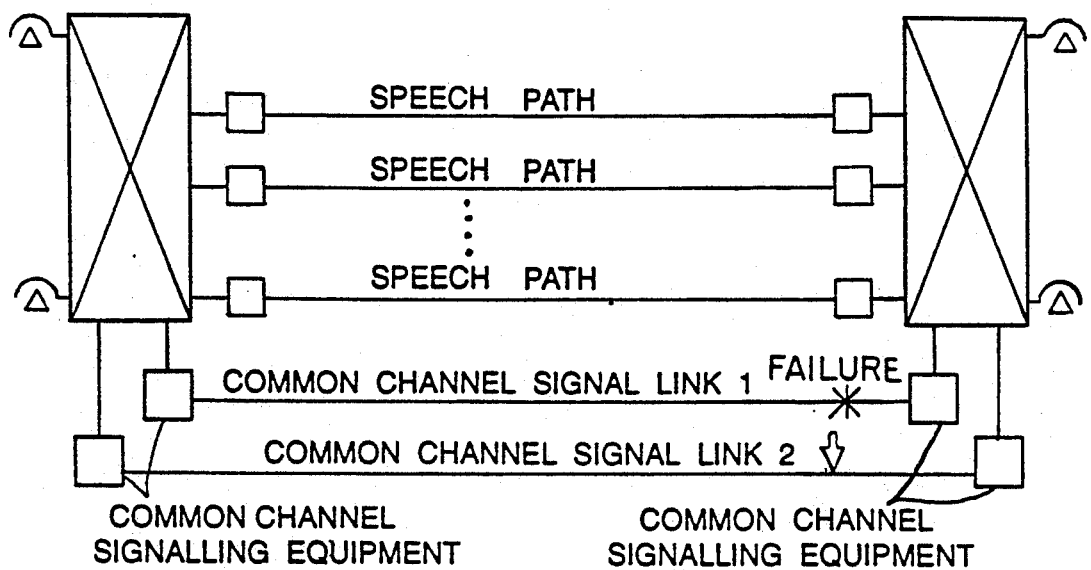
FIG. 12   BACKUP BY - REDUNDANT COMMON
CHANNEL SIGNAL LINKS
(PRIOR ART)
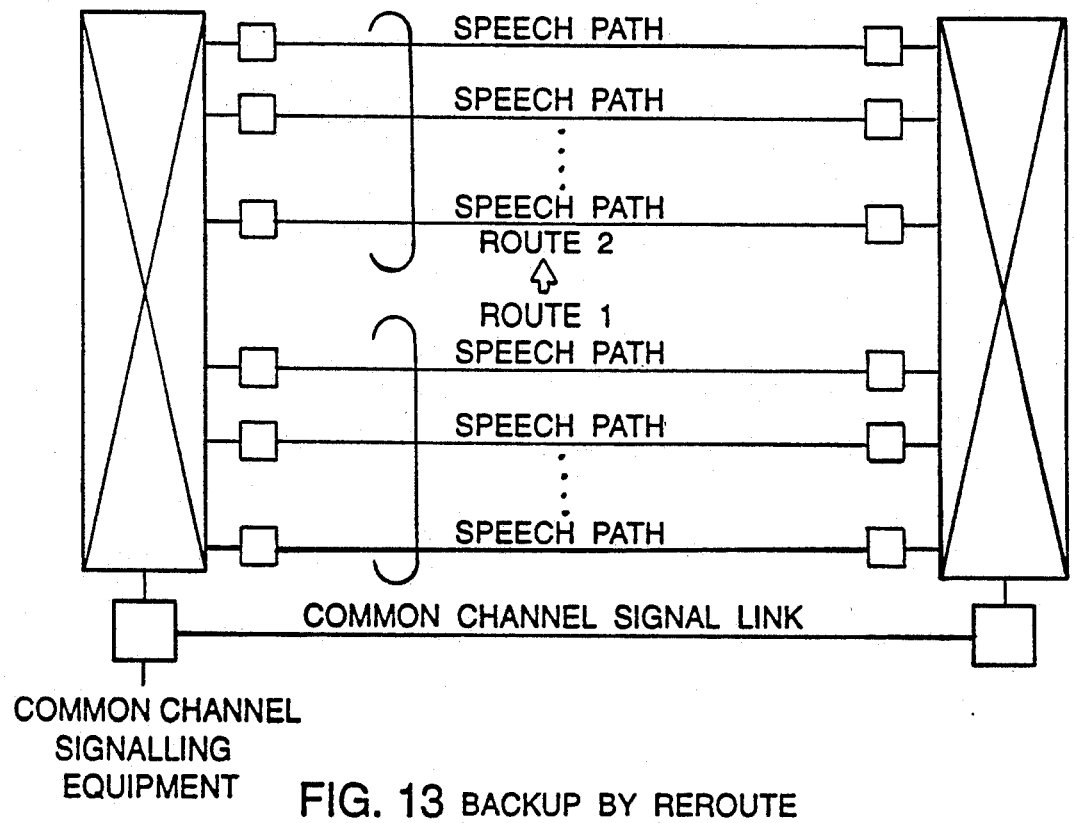
FIG. 13   BACKUP BY REROUTE
(PRIOR ART)

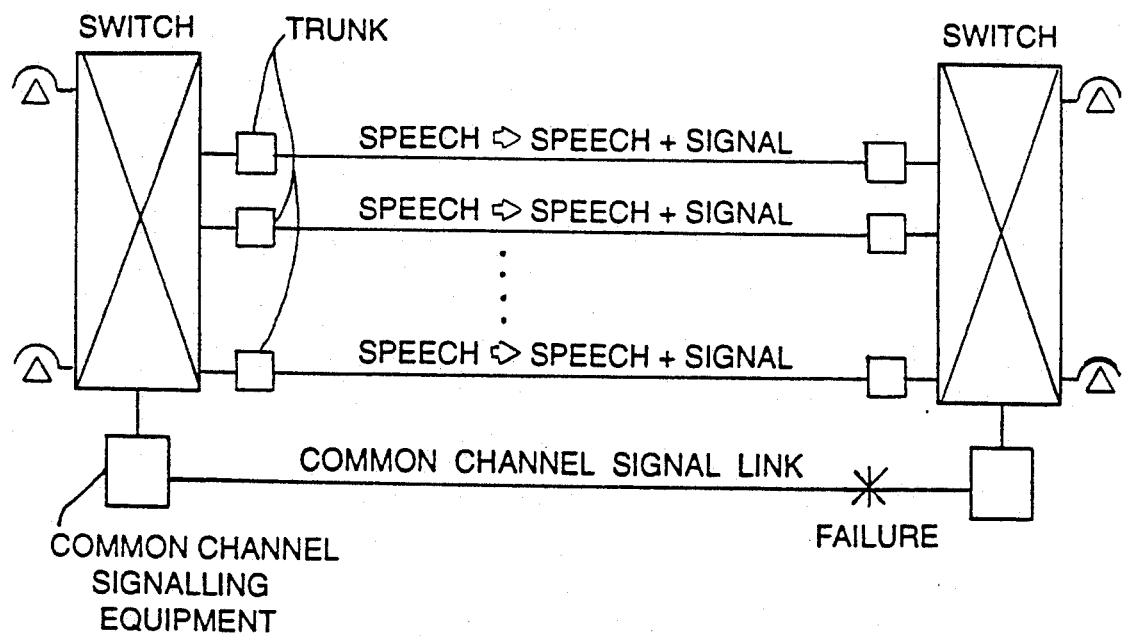
FIG. 14  BACKUP BY CHANGEOVER TO CHANNEL-ASSOCIATED SIGNALLING

SWITCHING SYSTEM FOR ELECTRONIC SWITCHER

This is a continuation-in-part of application Ser. No. 07/513,608, filed Apr. 24, 1990, now abandoned.

BACKGROUND OF THE INVENTION

1. Field of the Invention

The present invention relates to a switching system for an electronic switcher which system employs common channel signalling and channel-associated signalling. More particularly, the invention relates to a method and a system which are capable of employing channel-associated signalling for connecting a fundamental call if failure results in disabling a common channel signal link for transferring control information for the call processing.

2. Description of the Prior Art

The relation between a channel-associated signalling and a common channel signalling will be explained by using FIG. 10 and FIG. 11. FIG. 10 shows the aspects of channel-associated signalling. In channel-associated signalling, the transmission of the information necessary for controlling the connection between exchange offices is performed through respective speech paths. The information necessary for controlling the connection between the exchange offices is transmitted and received through the speech path by means of DP (dial pulse) signal and MF (multi-frequency) signal.

FIG. 11 shows the aspects of common channel signalling. In common channel signalling, the information necessary for controlling the connection between the exchange offices is transmitted and received through a separate leased signal path different from the speech path. This signal path is commonly used by a number of speech paths. Further, this signal path, that is independently established for transmitting the information necessary for controlling the connection between the exchange offices, is referenced as a "common channel signal link."

Traditionally, the following measures are provided for failure caused in the common channel signalling to transfer the control information for the call processing.

As described in the Official Gazette JP-A-62-48175, one of those measures serves to switch the common channel signalling to the channel associated signalling when it is determined that some failure results in disabling the signal link.

The foregoing prior art, however, does not obviously propose a concrete means for carrying out the change-over control of both signalling modes. In particular, nothing is disclosed as to how to control a call being active at a time point or later when these signalling systems are switched to each other.

Heretofore, the following two methods were relied upon as back-up means when the common channel signal link fails.

The first method will be explained by using FIG. 12. According to such first method, a common channel signal link for back-up is provided. When a failure occurs in one of the common channel signal links, the failed common channel signal link is switched to another common channel signal link. Consequently, the information necessary for controlling the connection between the exchange offices can be continuously transmitted.

The switch to the back-up common channel signal link at the time of failure and the change back at the time of failure recovery depends on the change-over and change back processes defined by IEE Report by Welch, Institution of Electrical Engineers Report, "Signalling in Telecommunications Network." pp. 260–321, or CCITT No. 7 signal system shown in Telephony, "Common Channel Signalling based on CCITT No. 7," pp 85–98 (Feb. 9, 1981).

The second method will be explained by using FIG. 13. According to such second method, there is provided a reroute, from a route to an opposite office comprising a speech path controlled by the common channel signal link, to another route at the time of failure in the common channel signal link.

In FIG. 13, a reroute from the route 1, controlled by the common channel signalling to the route 2, controlled by the channel-associated signalling is provided.

In both methods, problems existed in connection with the effective use of trunk lines between exchange offices.

SUMMARY OF THE INVENTION

It is therefore an object of the invention to provide a switching system which is capable of easily switching the common channel signalling to the channel-associated signalling when failure results in disabling a common channel signal link. The signal link refers to a transmission path for transferring signalling information for at least a call control between exchange offices.

In the exchange system controlled by a common channel signalling system, in order to solve the problems of the prior art, the back-up means, in connection with failure of the common channel signal link, according to the present invention will be explained as follows: in the speech path group controlled by the common channel signalling, as shown in FIG. 14, a corresponding speech path group is controlled by channel-associated signalling, thus continuing the exchange connecting control when the common channel signal link fails.

It is a further object of the invention to provide a switching system which is capable of recognizing that failure is caused on the signal link and easily carrying out automatic change-over from the common channel signalling to the channel-associated signalling or vice versa based on the recognition.

It is another object of the invention to provide the call set up/release procedure so that a call in an active state which is set up by means of common channel signalling can be released by means of the channel-associated signalling procedure in case the change-over from the common channel signalling system to the channel-associated signalling system is carried out because failure takes place on the common channel signal link.

Or vice versa, the call set up/release procedure is provided that a call in an active state which is set up by means of channel-associated signalling can be released by means of common channel signalling system in case the change-over from the channel-associated signalling to the common channel signalling is carried out.

The switching system according to the invention is designed to keep the common channel signalling system in parallel relation to the channel-signalling system, ignore the channel-associated signalling information if the signal link stays in a normal state and stays in the common channel signalling system, and change into the channel-associated signalling system if failure takes place on the signal link.

BRIEF DESCRIPTION OF THE DRAWINGS

FIG. 10 is a view showing channel-associated signalling aspects;

FIG. 11 is a view showing common signalling aspects;

FIG. 12 is a view showing backup-by a redundant common channel signal link;

FIG. 13 is a view showing back-up by reroute; and,

FIG. 14 is a view showing back-up by changeover to channel-associated signalling.

DESCRIPTION OF THE PREFERRED EMBODIMENT

Hereinafter, a detailed description will be directed to a switching system according to the invention.

Figure 1:
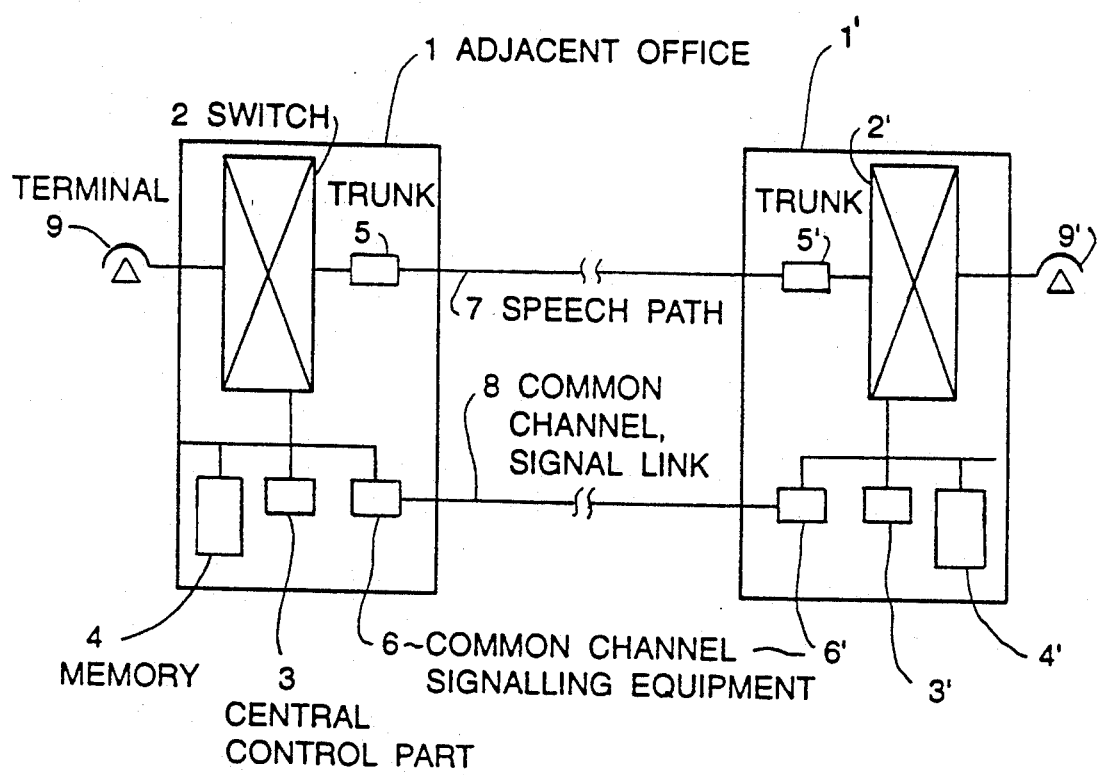
FIG. 1 is a schematic block diagram showing one embodiment of an electronic switching system employing a common channel signalling system to which the electronic switching system the present invention is applied.

At first, as shown in FIG. 1, 1 and 1' denote adjacent offices being opposite to each other. The offices 1 and 1' respectively comprise change-over switches 2, 2', central control parts 3, 3', memories 4, 4' calling trucks 5, 5', and common channel signalling equipments 6, 6'. These adjacent offices 1, 1' are connected through a speech path 7 and a common channel signal link 8, while the adjacent offices 1, 1' accommodate terminals 9, 9'.

The foregoing description is directed to the logical arrangement closely related to the invention. In general, in addition to the foregoing elements, the adjacent offices, include the component elements such as an external storage part or a maintenance terminal. Yet, these elements may not be illustrated in the drawings, because they have no concern with the present invention.

Next, the function block of the switching operation shown in FIG. 2 will be described in correspondence to the hardware arrangement shown in FIG. 1.

Figure 2:
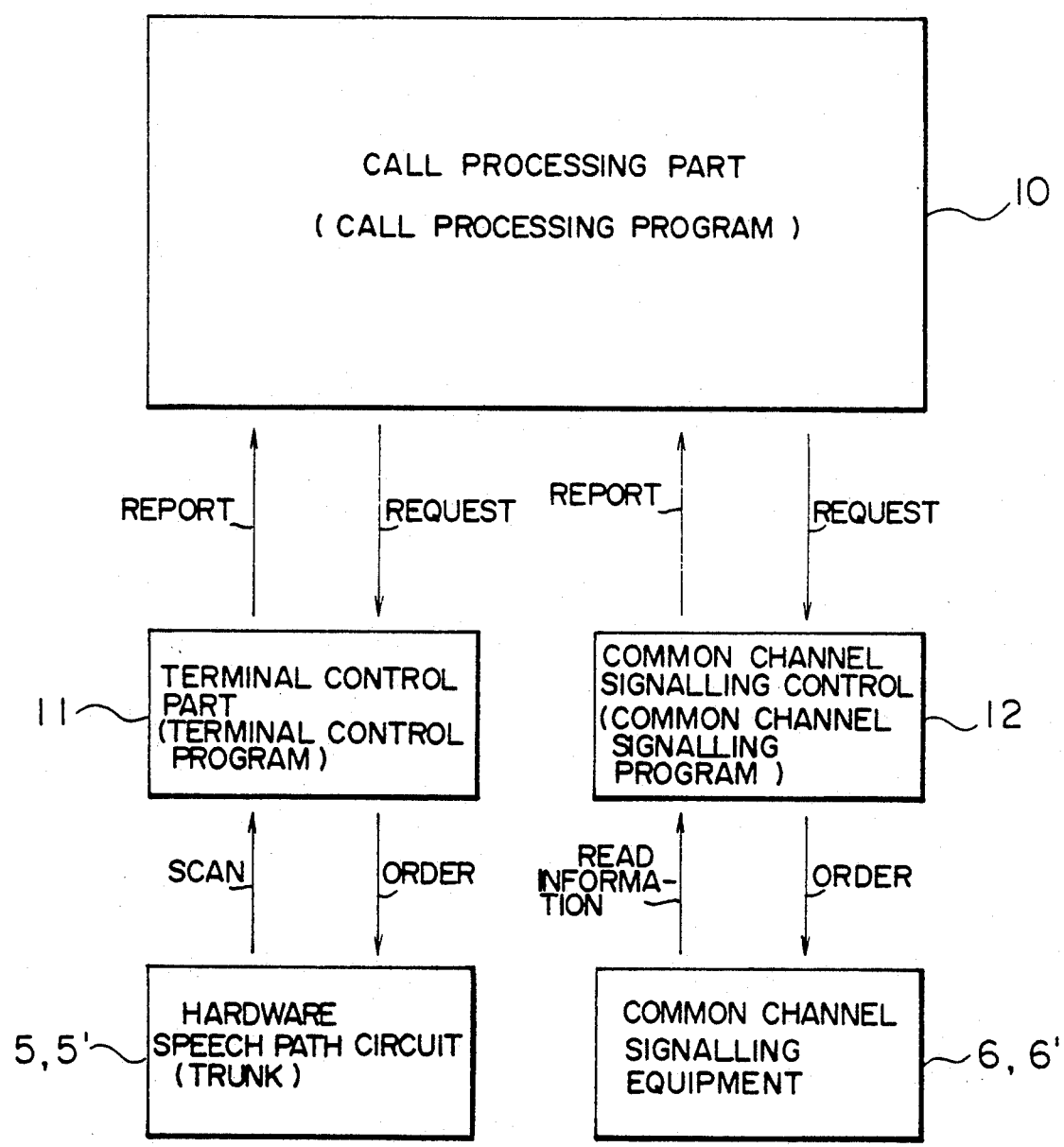
FIG. 2 is a flowchart showing the software into which is incorporated a parallel control function employing common channel signalling control and channel-associated channel signalling control.

A call processing part 10 including a switching program for executing the switching service, a terminal control part 11 including a terminal control program for controlling a channel line terminal for the calling trucks 5, 5', a common channel control part 12 including a common channel signalling control program for controlling the common channel signalling equipment, as shown in FIG. 2, respectively correspond to the function parts included in the central control parts 3, 3' and memories 4, 4' as shown in FIG. 1. And, the call processing part 10 serves to support logical interface with the terminal control part 11 in the channel-associated signalling system for transmitting or receiving a signal matching a calling status in the channel-associated channel signal to or from the adjacent office in accordance with an indication sent from the call processing part 10. And, the terminal control part 11 serves to scan and order hardware of the calling trunks 5, 5'. For the associated signalling, the terminal control part 11 serves to inform the call processing part 10 of the change of hardware to be scanned and order hardware (trucks 5, 5' and the like) in accordance with a requirement from the call processing part 10. On the other hand, under the common channel signalling system, the call processing part 10 serves to support logical interface with the common channel signalling part 12 in a manner to transmit or receive the common channel signal to or from the adjacent office.

That is to say, under the channel-associated signalling system, the terminal control program supports logical interface with the calling processing in a manner to transmit a signal matching a calling status in the channel-associated signalling system to the adjacent office in accordance with an indication from the call processing program. Further, the signal sent from the adjacent office in the channel-associated signalling system is transmitted as a processing request to the call processing program, thereby the call processing program serves to perform call processing in the channel-associated signalling system.

The present invention, on the other hand, serves to keep the channel-associated signalling system in a parallel relationship to the common channel signalling system as well as to ignore a processing request sent from the terminal control program in the common channel signalling system, resulting in easily switching the common channel signalling to the channel-associated signalling system.

Next, the sequence of the operation flow for the switching operation according to the invention will be described with reference to FIGS. 3, 4, and 5.

Figure 3:
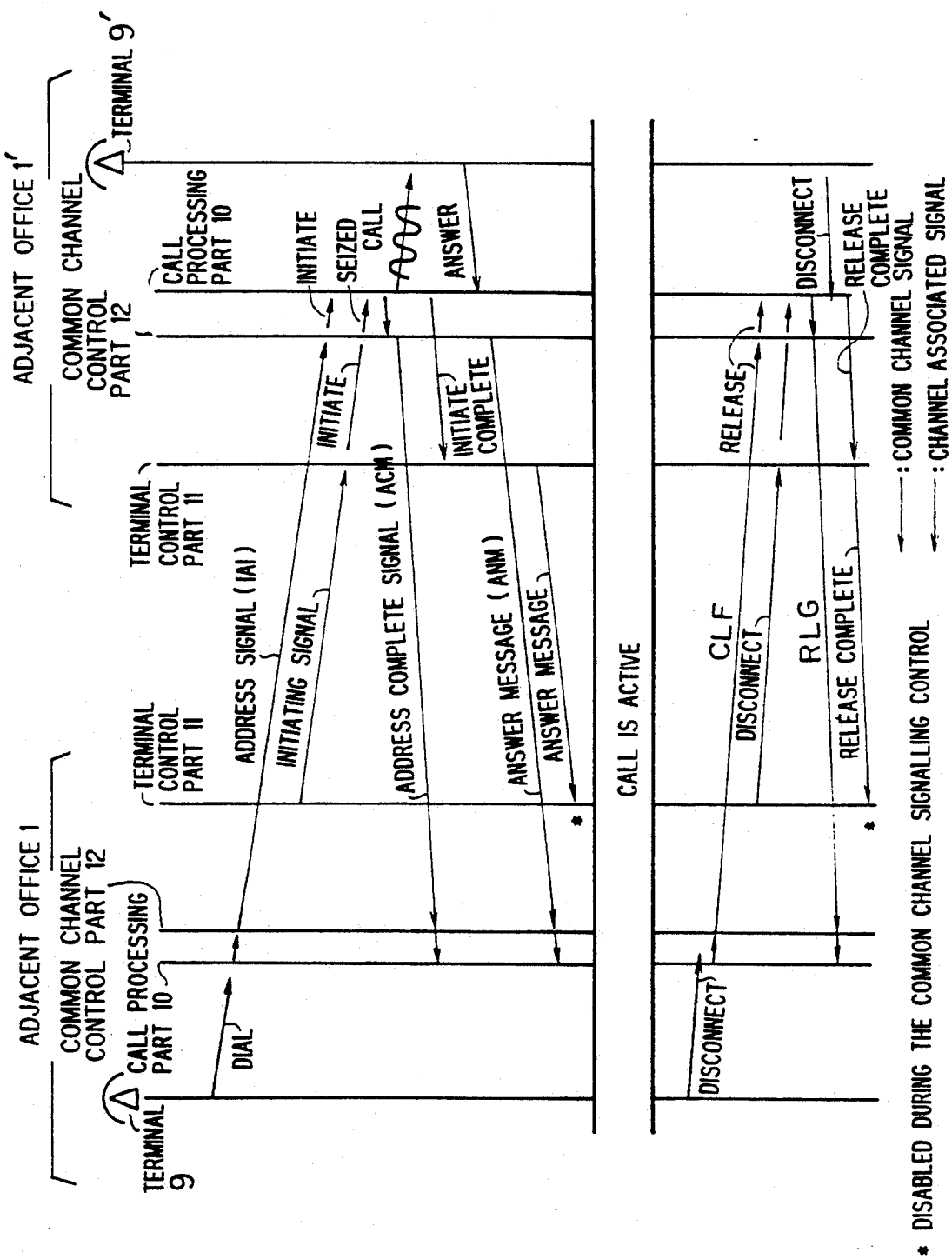
FIG. 3 is a view showing signal sequence between each function block in case of the parallel control of the common channel signalling and the channel-associated signalling if the signal link is normal.

FIG. 3 shows the sequence of a signal communicated between respective function blocks. FIGS. 4 and 5 show the call processing flow executed in the call processing part 10 shown in FIG. 2.

First, with reference to FIG. 4, the channel-associated signalling system will be described as an example of how to connect a receive-in truck in the normal calling operation. The terminal control part 11 serves to detect a call initiating request from the adjacent office and then to inform the call processing program (call processing part 10) of the request. Next, if the call processing program is controlled in the normal state transition mode and receives a calling report (102), it analyzes a type of trunk or service (106) and issues a processing request to the terminal control part (11) in a manner to connect a dial-pulse signal or a push-button signal receiver for receiving figures (108). The call processing such as call proceeding of the receive-in trunk is executed in accordance with the similar procedure.

Next, likewise, with reference to FIG. 4, the common channel signalling control will be described. At first, the common channel signalling program (common channel signalling part 12) receives an initial address message (IAI) from the adjacent office and informs the call processing program(call processing part 10) of the message (104). Then, the call processing program serves to analyze a type of trunk and service (106) as in the channel-associated signalling and execute the call processing (114). As shown in FIG. 4, under the common channel signalling control, the call processing program serves to receive an initiating signal from the common channel signalling part 12 (104) and send an initiated signal to the terminal control part 11 and the con, non line signalling control part 12 (110, 112), thereby reaching the call proceeding state. As a result, the initiating signal (102) received from the terminal control part 11 is discarded in the call processing part 10 as ineffective information.

Figure 5:
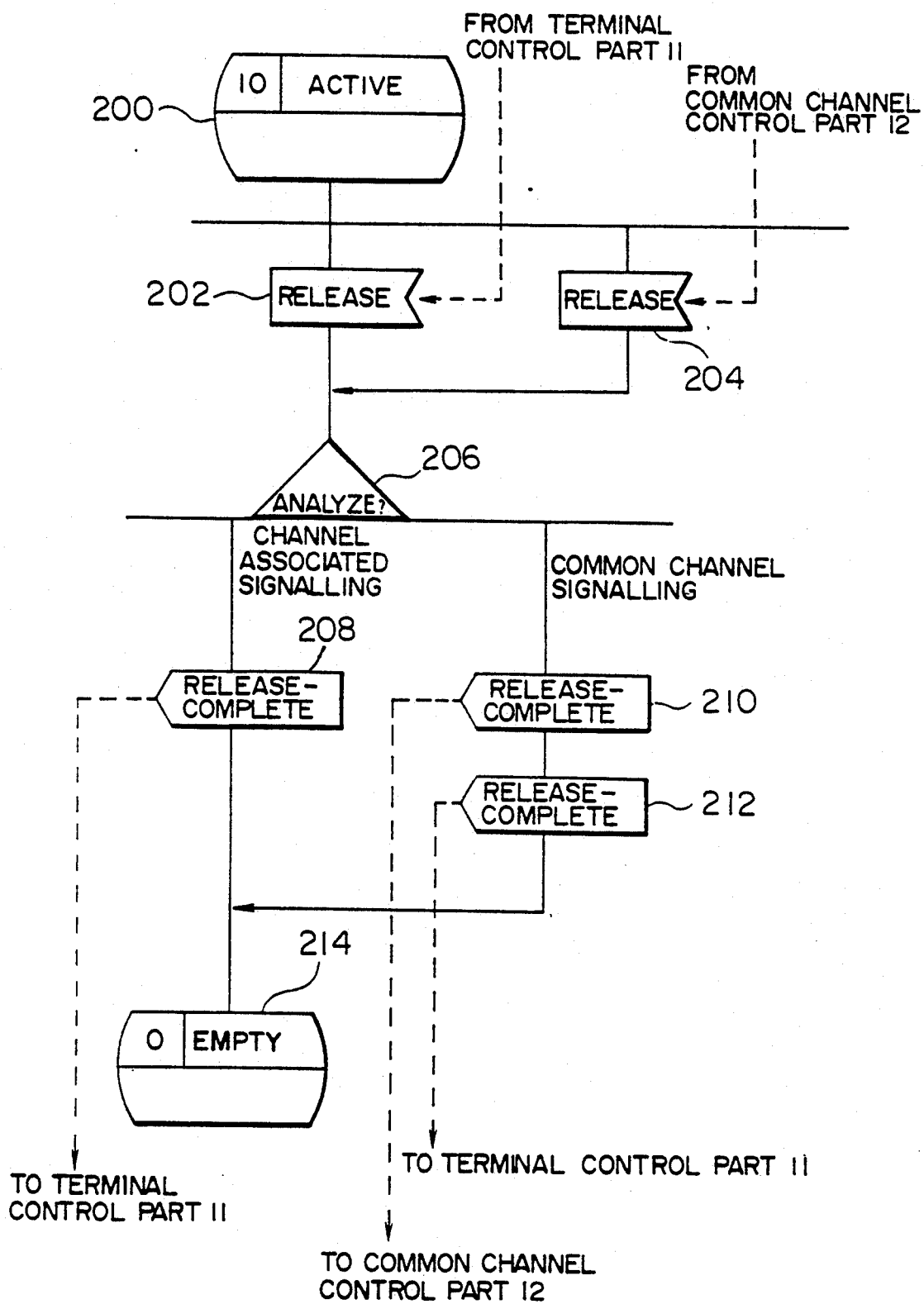

As shown in FIG. 5, on the other hand, the similar method is carried out for the call releasing operation while a call is active.

That is, when the terminal control part 11 detects a call-disconnecting signal from the adjacent office while a call is active (200), it reports the signal as the call releasing report to the call processing part 10 (202). Like the initiating operation as shown in FIG. 4, the call processing part 10 serves to analyze data such as a type of trunk (206) and, if the signalling system is determined as the channel-associated signalling system, issue a call-releasing signal to the terminal control part 11 (208). If the system is determined as a common channel signalling system, however, the terminal control part 11 serves to receive information about call releasing from the con, non channel signalling part 12 (204), analyze it (206), and send out the call-releasing signal to the con, non channel signalling part 12 and the terminal control part 11 (210, 212).

FIG. 3 illustrates the sequence of the channel-associated signal and common channel signal communicated between the adjacent offices 1 and 1' according to the processing system described above. This case is done in the common channel signalling system.

Assuming that the terminal 9 issues a number of the terminal 9' for talking with the terminal 9', for forming a send-out path, the adjacent office 1 sends out an address signal (IAI) as a common channel signal through the common channel signalling path 8 and an initiating signal as the channel-associated signal through a speech line 7 to the adjacent office 1'. The adjacent office 1' invalidates the initiating signal passing in the channel-associated signalling system, because it determines that it is under the common channel signalling control. The adjacent office 1' serves to receive and analyze the IAI signal passing through the common channel for calling the terminal 9'. At a time, it serves to send back an address complete message (ACM) to the adjacent office 1 through the common channel. Then, in response to the terminal 9', the adjacent office 1' serves to answer messages to the adjacent office 1 through the common channel and the associated channel. The adjacent office 1 serves to invalidate the answer message passing through the associated channel, because the office 1 is under the common channel signalling control and then to set up a call between the terminals 9 and 9' in response to the answer message passing through the common channel. For doing the call releasing while the call is active, it is possible to take the similar steps of invalidating a call-disconnecting signal as well as a call releasing complete signal passing through the associated channel.

Similarly, the call processing program (call processing part 10) serves to analyze a type of trunk (106, 206). Then, it determines if the call set-up should be controlled by the common channel signalling or the channel-associated signalling in accordance with the status of the signal link and then sets up the call. If failure is recognized on the signal link, the program serves to validate an channel-associated signal from the speech line and to keep the fundamental call set-up.

Figure 6:
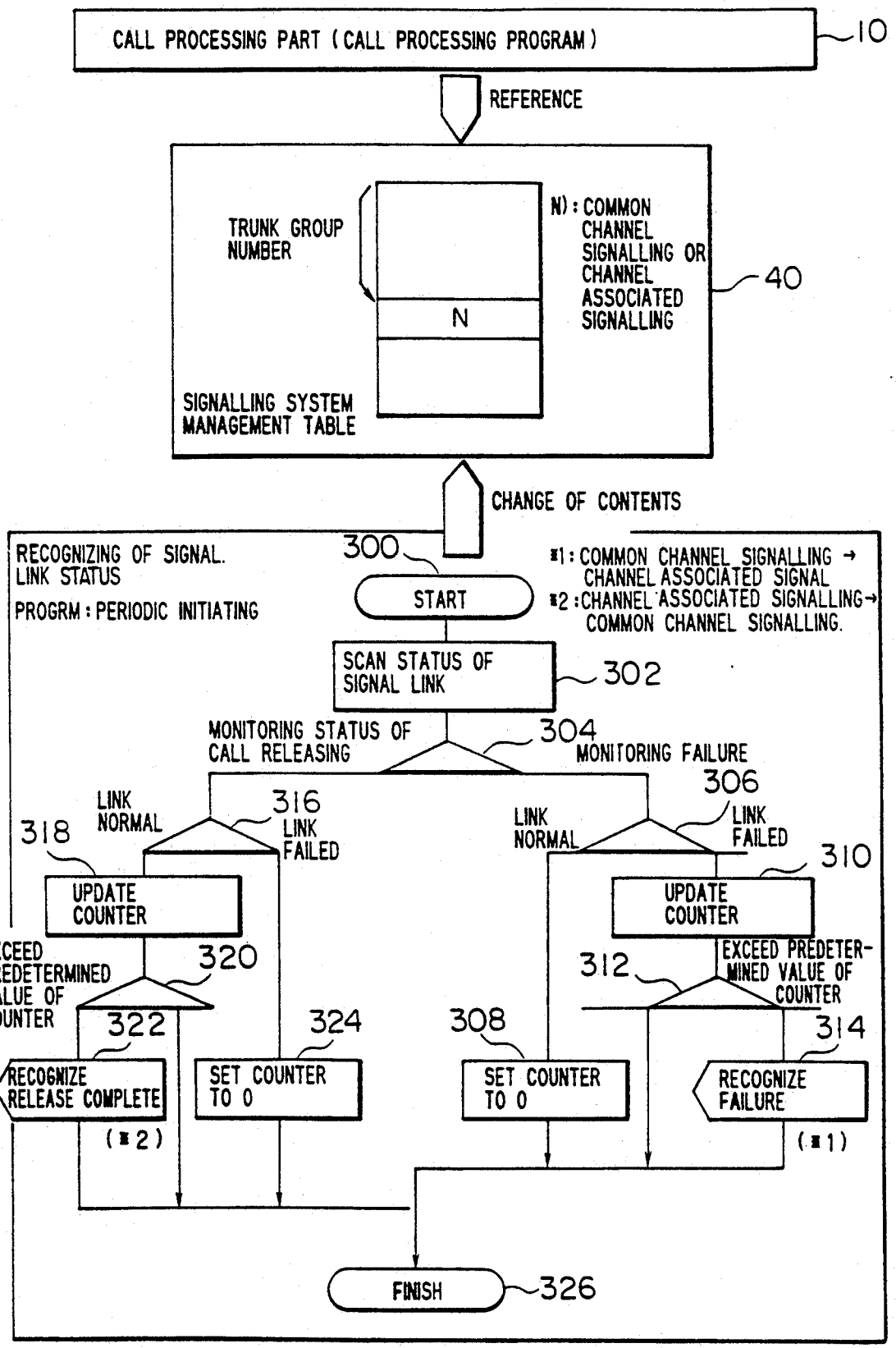
FIG. 6 is a flowchart showing mutual relation among a signal-link status control program, a signalling-system management table, and an exchanging program.

FIG. 6 shows the structure of a signalling management table and its mutual relation, the signalling management table referred by the call processing program for determining if the common channel signalling or the channel-associated signalling system is employed for the call set-up in accordance with the status of the signal link. At first, the signal-link status recognition program 302 serves to scan the status of the signal link each time it is initiated at a period of about ten seconds (302). The following description is based on the case in which failure takes place in a normal signal link. If failure takes place in the scanned signal link (306), the failure recognition counter increases by one (310). In the next period or later, the similarly-recognized failure results in allowing the counter to increase by one. If the counter finally reaches a predetermined value (312), the call processing program serves to recognize that fixed failure takes place on the signal link and modify the content of the signalling management table 40 in a manner to allow the table-controlling system to change from the common channel signalling to the channel-associated signalling (314). Further, if the failed signal link is changed to a normal state, the call processing program serves to recognize that the signal link enters into a normal state in accordance with the similar process (316 to 320). In this instance, the program modifies the content of the table 40 in a manner to change a controlling system for the signalling management table 40 from the channel-associated signalling to the con, non channel signalling (322).

The signalling management table 40 is to be referred by the call processing part 10 in the call set-up process (described with reference to FIGS. 3 to 5) (analysis 106, 206) and to be controlled by the common channel signalling or the channel-associated signalling.

In the arrangement shown in FIG. 1, the signalling management table 40 is saved in the memories 4, 4' and is referenced by the central processing parts 3, 3' while the trunks 5, 5' are initiated or released. At each call, the call processing program serves to analyze the status of the signal link and determine if the channel-associated signalling or the common channel signalling is used for setting up or releasing the call.

Figure 7:
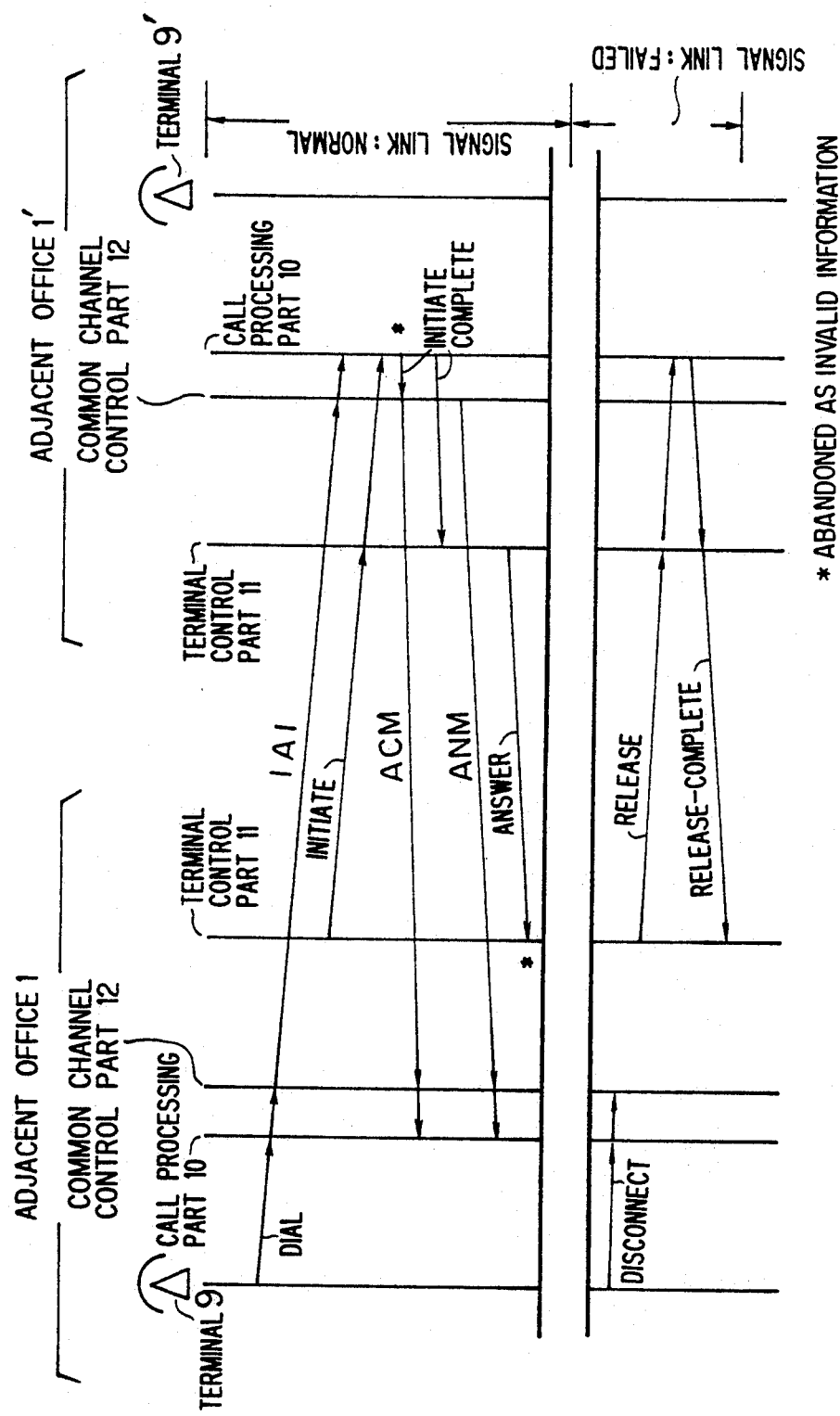
FIG. 7 is a view showing signal sequence executed if the signal link is failed while a call is active.
Figure 8:
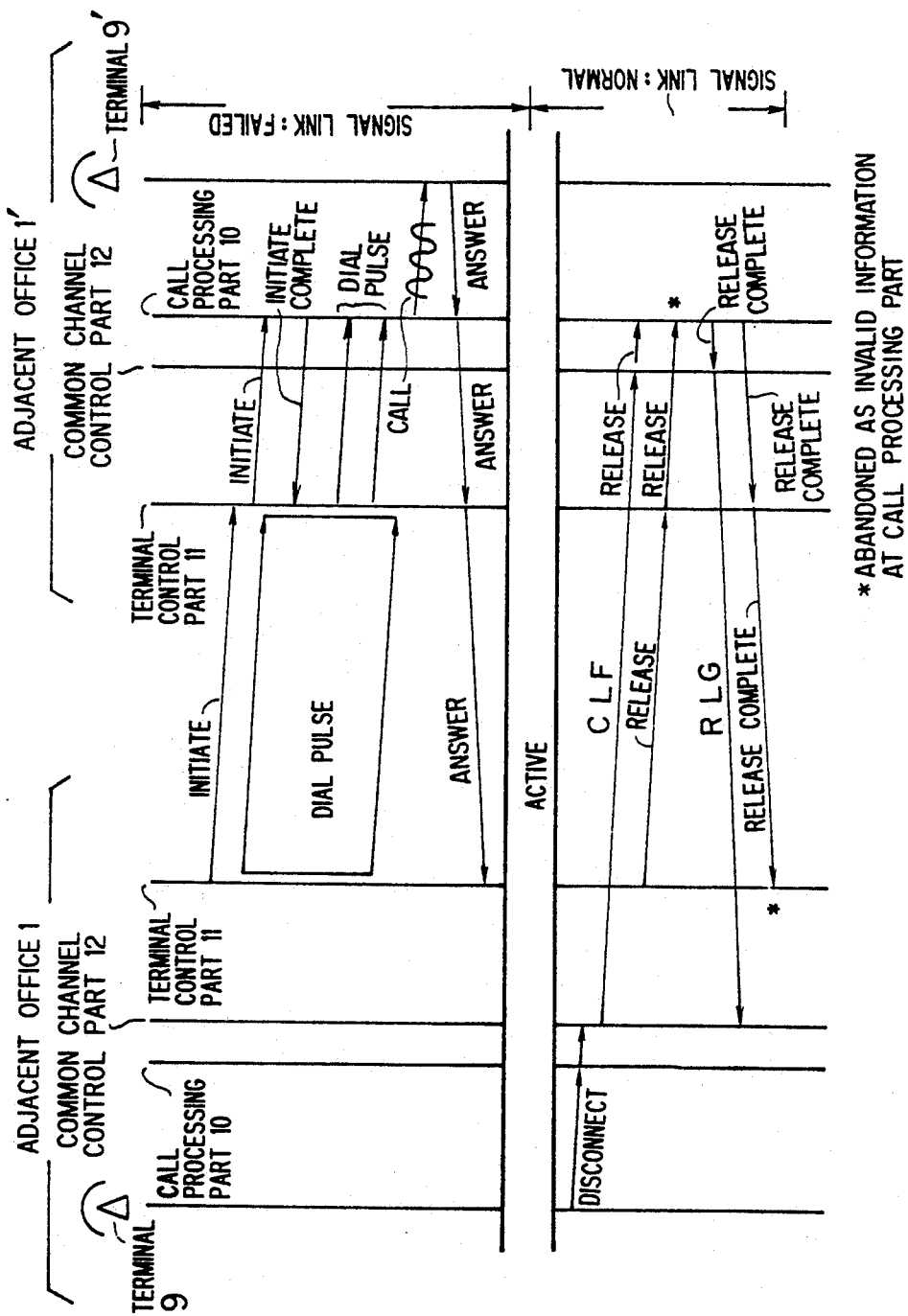
FIG. 8 is a view showing signal sequence executed if a call is released on the signal link and released while a call is active.
Figure 9:
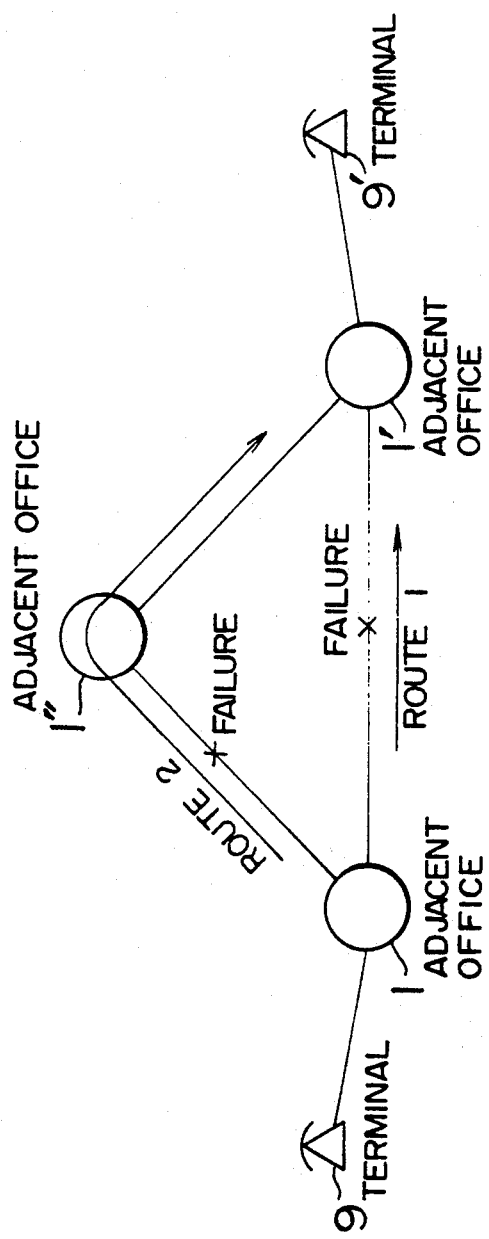
FIG. 9 is a view illustrating the operation of the switching system according to the invention.

FIG. 7 illustrates a con, non channel signalling and channel-associated signalling sequence employed in the case where when failure takes place in the signal link, the initiated call is controlled by the channel-associated signalling for setting up an active call, but if the call is released while the call is active, the controlling system is switched from the channel-associated signalling to the common channel signalling.

Figure 4:
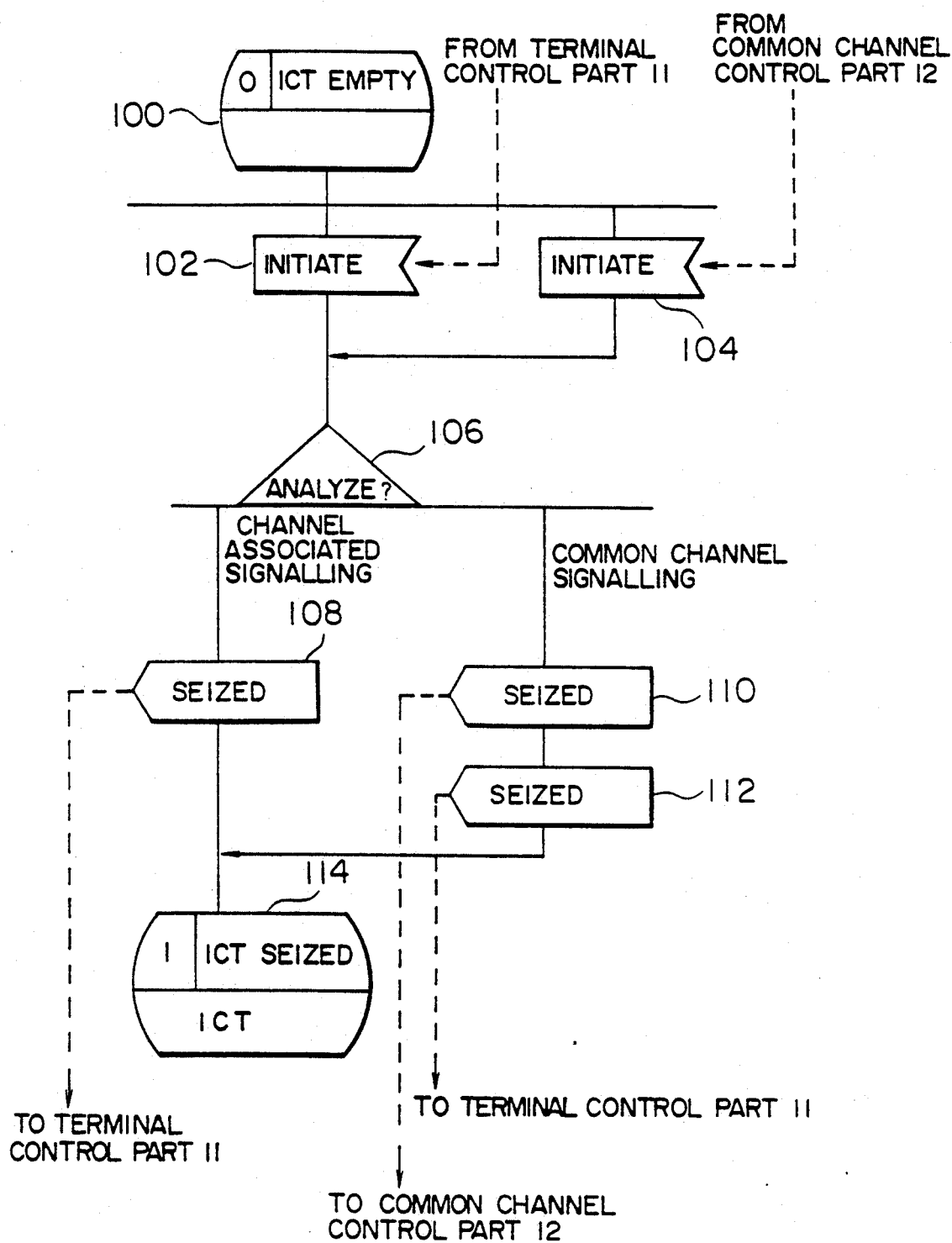
FIGS. 4 and 5 are flowcharts showing switching procedure executed in the switching section.

The switching control will be easily understood from the description shown in FIGS. 4 and 5. The description is thus omitted.

Next, a description will be directed to the actual operation of the present invention based on the common channel signalling network.

In order to connect the terminal 9 accommodated in the adjacent office 1 to the terminal 9' accommodated in the adjacent office 1', if failure takes place in a route 1 assumed as the common channel signalling path, the terminal 9 is connected to the terminal 9' through a route 2 assumed as an alternate route if it is provided. Yet, if the route 2 assumed as an alternate route is not provided or the route 2 has failed as well, the switching control system according to the invention serves to switch a speech line between the adjacent offices 1 and 1' from the common channel signalling to the channel-associated signalling for the purpose of setting up a call.

As set forth above, the present invention is capable of easily switching from the common channel signalling to the channel-associated signalling if failure takes place on the signal link and making effective use of the channel-associated signalling for keeping the speech line as well as keeping an active call without having to give any failure to the call, thereby being unable to lower serviceability.

And, the conventional system basically employs redundant arrangement of the signal link for preparing the failure caused on the signal link, while the present invention makes it possible to discard the redundant arrangement, resulting in greatly reducing the cost of the common channel signalling equipment.

What is claimed is:

1. A switching system for selectively controlling a call control of a group of speech paths between exchange offices comprising:
   first control means for executing the call control of the group of speech paths by a common channel signalling;
   second control means for executing the call control of the group of speech paths by a channel-associated signalling for performing transmission of information necessary for controlling connection between the exchange offices through respective speech paths;
   means for monitoring a failure on a common channel signal link which forms a signal path established separately from the speech path for transmitting the information necessary for controlling the connection between the exchange offices and is used for the call control of the group of speech paths;
   said common channel signal link being comprised of a transmission path for tranferring signalling information for the call control between the exchange offices; and
   means for selectively changing over the call control between the first control means including the common channel signalling and the second control means including the channel-associated signalling wherein the changing over means includes means for selectively changing over, responsive to detection of the failure on the common channel signal link by the monitoring means, the call control of the group of speech paths which are controlled by the common channel signalling so as to be controlled by the channel-associated signalling and, responsive to a determination that the common channel signal link is normal, selectively changing back the call control to common channel signalling.

2. The switching system as claimed in claim 1, wherein said monitoring means includes means for performing monitoring of the failure on said common channel signal link in a periodic initiating fashion for a predetermined time, and said switching system further includes means for recognizing the failure in response to the detection of the failure by said monitoring means.

3. The switching system as claimed in claim 2, further comprising means for changing a content of a management table for a signalling system so that said changing over means changes over the call control of the particular group of speech paths from the common channel signalling to the channel-associated signalling when the failure on the signal link is recognized by the recognizing means.

4. The switching system as claimed in claim 3, wherein said monitoring means comprises means for monitoring a recovery of said common channel signal link in a periodic initiating fashion for a predetermined time and the recognizing means recognizes the recovery from the failure when said monitoring means detects the recovery from the failure.

5. The switching system as claimed in claim 4, wherein said means for changing the content of the management table includes means for changing the content so that the changing over means changes the call control of the group of speech paths performed by the second control means including channel-associated signalling to the first control means including the common channel signalling when the recovery of said common channel signal link from the failure is recognized by the recognizing means.

6. A switching method for an electronic switcher comprising the steps of:
   controlling a particular group of speech paths maintaining a common channel signalling system and a channel-associated signalling system in a parallel relationship;
   maintaining switching information in the channel-associated signalling system as ineffective information if a common channel signal link is in a normal state;
   performing switching control in the common channel signalling system;
   performing the switching control in the channel-associated signalling system if a failure takes place on the common channel signal link; and
   changing back the switching control to the common-channel signalling system upon recovery of the failure.

7. The switching method as claimed in claim 6, further comprising monitoring a failure on said common channel signal link in a periodic initiating fashion for a predetermined time, and recognizing the failure when the failure is detected.

8. The switching method as claimed in claim 6, further comprising monitoring the recovery of said common channel signal link from the failure in a periodic initiating fashion for a predetermined time, and recognizing the recovery from the failure when the recovery from the failure is detected.

9. The switching method as claimed in claim 6, further comprising setting up a call in the way of the common channel signalling system and releasing the call in the way of the channel-associated signalling system if the failure is recognized on said common channel signal link while said call is active.

10. The switching method as claimed in claim 6, further comprising setting up a call in the way of the channel-associated signalling system, and releasing the call in the common channel signalling system if the recovery from the failure is recognized on said common channel signal link while the call is active.

11. The switching system as claimed in claim 1 wherein the means for selectively changing over the call control includes a counter for counting a predetermined number of failures detected on the common signal link, wherein when the predetermined number is reached the change-over occurs.

* * * * *